May 20, 1924.

H. C. WALTER

THREAD MILLING CUTTER

Filed July 31, 1922

1,494,517

INVENTOR.
Henry C. Walter
BY
G. H. Braddock
ATTORNEY.

Patented May 20, 1924.

1,494,517

UNITED STATES PATENT OFFICE.

HENRY C. WALTER, OF BRIDGEPORT, CONNECTICUT.

THREAD-MILLING CUTTER.

Application filed July 31, 1922. Serial No. 578,757.

*To all whom it may concern:*

Be it known that HENRY C. WALTER, a citizen of the United States, and resident of Bridgeport, in the county of Fairfield and State of Connecticut, has invented certain new and useful Improvements in Thread-Milling Cutters, of which the following is a specification.

This invention relates to a thread-milling cutter, and the broad object of the invention is to provide a novel and improved thread-milling cutter which will be more efficient than any of the same general type heretofore known when considered from the standpoint of durability, speed of production, and results obtained, the present cutter being capable of cutting a clean, deep thread when operating upon metal at a high rate of production.

A more specific object of the invention is to provide a thread-milling cutter equipped with cutter portions for producing thread having straight, tapering sides and to provide each cutter portion with a cutting edge on one side only thereof.

A further specific object is to arrange all of the cutting edges of the cutter portions so that each is on a line which is radial with respect to the axis of the cutter to operate in a plane normal to the thread being cut.

A still further specific object is to arrange the cutting edges of alternate cutter portions on the same sides of the cutter portions so that one-half of the cutting edges are at one side of the thread-milling cutter and the other half are at the opposite side thereof.

A still further object is to provide a thread-milling cutter the advancing faces or sides of the cutter portions of which are oblique or inclined to the axis of the cutter, to slant rearwardly from the cutting edges of the cutter portions, whereby the action of the cutting edges is a shearing one, free from scraping.

Yet a further object is to provided a thread-milling cutter each cutter portion of which is provided with one cutting edge arranged at one side of its forward or advancing face or surface, said advancing face or surface slanting rearwardly from the cutting edge to be arranged at an oblique angle to the axis of the cutter, and the heel of each cutter portion being relieved back of the cutting edge to afford clearance in passing through a thread and being planed or cut down on its side opposite the cutting edge to afford a chip space.

And a further object is to provide a thread-milling cutter of disc form having cutter portions the alternate ones of which are duplicates of each other, every other cutter portion having its cutting edge situated at the same side of the disc, and all of the cutter portions upon the same side of the disc being in alignment and having their cutting edges positioned radially with respect to the axis of the cutter and arranged at the same angle with respect to the length of said axis, whereby the duplicate cutter portions will accurately follow each other when milling a thread.

All of the features of the novel thread-milling cutter cooperate in the accomplishment of all of the objects above enumerated, and the whole structure lends itself to very efficient service, each cutter portion being capable of use throughout the greater part of its width and the structure offering no interference to ready and accurate sharpening of the cutter portions and their cutting edges, all as will be hereinafter fully set forth.

With the above objects in view, as well as others which will appear as the specification proceeds, the invention comprises the construction, arrangement and combination of parts as now to be fully described and as hereinafter to be specifically claimed, it being understood that the disclosure herein is merely illustrative of the principles and meant to in no way limit the spirit of the invention, changes in details of construction and arrangement of parts being permissible so long as within the scope of the appended claims.

In the accompanying drawing forming a part of this specification,

Figure 1:
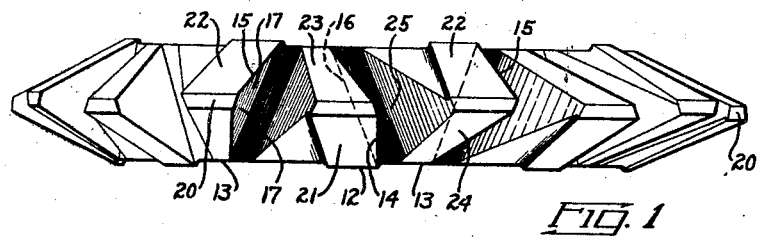
Fig. 1 is an edge view of the novel thread-milling cutter.
Figure 2:
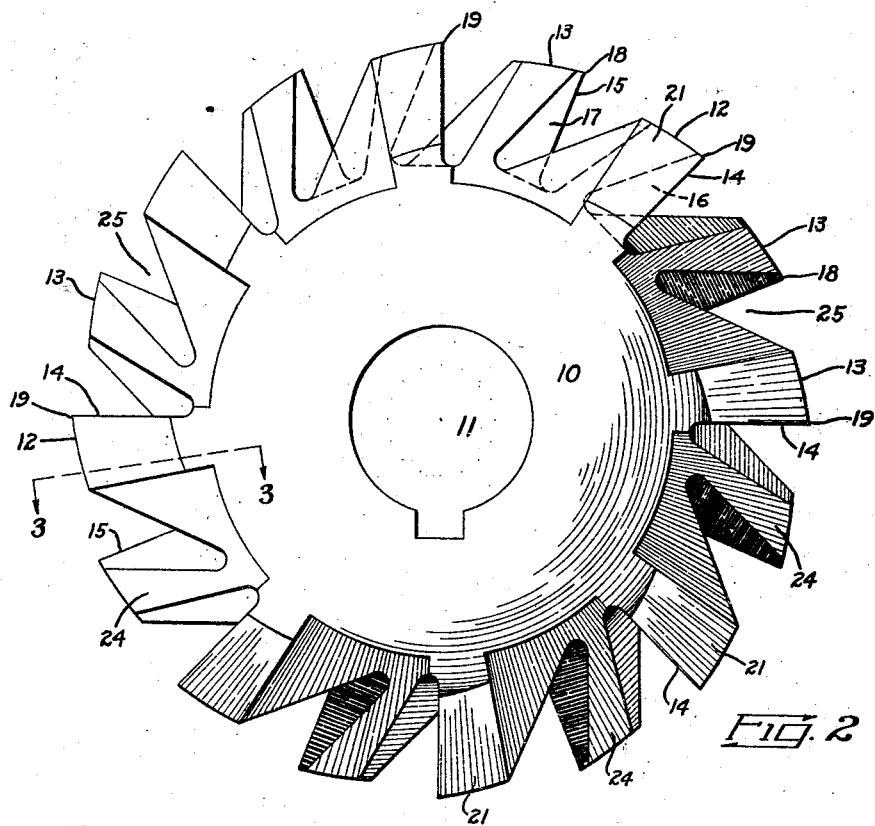
Fig. 2 is a face view thereof, a part being shaded to better bring out the invention.
Figure 3:
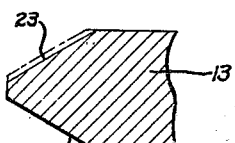
Fig. 3 is a sectional view on line 3—3 in Fig. 2.

With respect to the drawing and the numerals of reference indicated thereon, 10 denotes the body of the thread-milling cutter, shown as disc shaped, and 11 a centrally located opening in said body whereby the cutter can be rotatably mounted.

Numerals 12 and 13 denote, generally, the cutter portions upon the periphery of the body or disc and each of the peculiar construction now to be made clear.

Each cutter portion 12, 13, has a cutting edge on one side only thereof, all of the cutting edges of the cutter portions 12 being arranged at one side of the body or disc in alignment, and all of the cutting edges of the cutter portions 13 being arranged at the other side of the body or disc in alignment, and each cutter portion 12, 13, respectively, lying between cutter portions 13, 12. That is, all of the cutter portions 12, 13, are alternately arranged about the body.

As very clearly disclosed, each cutting edge 14, 15 of the different cutter portions 12, 13, respectively, are on lines which are radial with the axis of the thread-milling cutter, and the flat advancing faces or sides 16, 17 of the cutter portions 12, 13, respectively, carrying the cutting edges 14, 15, respectively, slant rearwardly from the cutting edges to be situated at an oblique angle to the axis of the cutter.

The cutting edges 14, 15 extend, on a straight line, outwardly from about the neighborhood of the periphery of the body and toward the center of thickness of the body of the cutter, all of the cutting edges having their inner and outer extremities, respectively, terminating at equal distances from the cutter axis. That is, all of the cutting edges have their inner extremities arranged on the oppositely disposed faces of the body and the cutting edges 14 and 15 converge, all of the cutting edges 14 terminating in a circumference denoted by the outer extremity 18 of any cutting edge 14 and all of the extremities of the cutting edges 15 terminating in an equal circumference denoted by the outer extremity 19 of any cutting edge 15, the outer edge, denoted 20, of each cutter portion having about the same width as the outer edge of every other cutter portion, a width preferably much less than the distance representing the thickness of the body or disc. All of the cutting edges 14, 15, respectively, are arranged at equal angles with respect to the length of the axis of the cutter and are in alignment about said axis, so that the cutting edges 14 will all accurately follow each other and the cutting edges 15 will all accurately follow each other to properly mill the straight, tapering sides of a thread.

Each cutter portion 12, 13 is relieved at 21, 22, respectively, back of its cutting edge 14, 15, respectively, to afford clearance in passing through a thread, and each cutter portion 12, 13 is planed or cut down as denoted at 23, 24, respectively, opposite its cutting edge 14, 15, to afford chip spaces, as will be understood.

All of the faces or sides 16, 17 of the cutter portions 12, 13 desirably slant rearwardly from the cutting edges 14, 15, to make equal oblique angles with respect to the axis of the cutter, whereas all of the faces or sides 16 slant in one direction and the faces or sides 17 slant in opposite direction, there being gashes 25 between the cutter portions 12, 13 and 13, 12 allowing for ready and accurate sharpening of the cutter faces 16, 17 and their cutting edges 14, 15. Evidently, the width of each cutter portion is thus greatest directly back of its cutting edge, the gash to the rear of each cutter portion slanting in a direction opposite that of the gash in front of the cutter portion and defining the flat advancing face and cutting edge thereof. Consequently, the cutter portions can have extremely long life, the greater portion of the width of each being capable of use in cutting operations, until the cross-section of metal back of the cutting edge of each is worn so that it cannot stand the strain.

By arranging each cutting edge on a line which is radial with respect to the axis of the cutter all of the cutting edges operate in a plane normal to the thread being cut, and by arranging the advancing faces or sides of the cutter portions, carrying the cutting edges, to be oblique or inclined to the axis of the cutter and to slant rearwardly from the cutting edges, the action of the cutting edges is a shearing one. It is unnecessary to remark that the advancing faces can have any suitable and preferred slant. I have found that an arrangement of each advancing face or side in a plane which is at an angle of twenty-two and one-half degrees to the axis of the thread-milling cutter is a satisfactory arrangement for certain purposes and results.

Having thus fully described the invention, what I claim as new and desire to secure by Letters Patent is:

1. A thread-milling cutter equipped with cutter portions each having a tapering side and a straight cutting edge in advance of said side, the advancing face of each cutter portion being adjacent said straight cutting edge and being inclined to the axis of the cutter to slant rearwardly therefrom, and the rearward face of each cutter portion slanting in a direction opposite that of the advancing face thereof so that the width of each cutter portion is greatest directly back of its cutting edge.

2. A thread-milling cutter equipped with cutter portions each having a side arranged at an oblique angle with respect to said cutter with a straight cutting edge in advance of said side, the advancing face of each cutter portion being adjacent said straight cutting edge and being inclined to the axis of the cutter to slant rearwardly from said cutting edge, and the cutter portions defining gashes about the periphery of the cutter and between the cutter portions, the gash to the rear of each cutter portion slanting in a direction opposite that of the gash in front thereof and defining the advancing face and cutting edge thereof, whereby the width of each cutter portion is greatest directly back of its cutting edge.

3. A thread-milling cutter equipped with cutter portions each constructed to produce thread having straight, tapering sides, each cutter portion being provided on one side thereof with a straight cutting edge arranged at an oblique angle to the body of the cutter, and the advancing face of each cutter portion being adjacent said straight cutting edge and being inclined to the axis of the cutter to slant rearwardly from said cutting edge, whereby gashes are provided about the periphery of the cutter and between the cutter portions, the rearward face of each gash being the advancing face of a cutter portion, and the forward face of each gash being the rearward face of each cutter portion and slanting in a direction opposite that of the advancing face of each cutter portion, whereby the width of each cutter portion is greatest directly back of its cutting edge.

Signed at Bridgeport, in the county of Fairfield and State of Connecticut, this 21st day of July, A. D., 1922.

HENRY C. WALTER.